United States Patent
Saito

(10) Patent No.: US 10,375,267 B2
(45) Date of Patent: Aug. 6, 2019

(54) MEDIATION SERVER

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya, Aichi (JP)

(*) Notice: Subject to any disclaimer, the term of this patent is extended or adjusted under 35 U.S.C. 154(b) by 0 days.

(21) Appl. No.: 15/473,855

(22) Filed: Mar. 30, 2017

(65) Prior Publication Data

US 2017/0353621 A1 Dec. 7, 2017

(30) Foreign Application Priority Data

Jun. 3, 2016 (JP) .................................. 2016-111941

(51) Int. Cl.
*H04N 1/00* (2006.01)
*H04N 1/32* (2006.01)
*G06K 9/00* (2006.01)

(52) U.S. Cl.
CPC ..... *H04N 1/32406* (2013.01); *G06K 9/00442* (2013.01); *H04N 1/00206* (2013.01); *H04N 1/00244* (2013.01); *H04N 1/00408* (2013.01); *H04N 1/32133* (2013.01); *H04N 2201/0081* (2013.01); *H04N 2201/3269* (2013.01)

(58) Field of Classification Search
None
See application file for complete search history.

(56) References Cited

U.S. PATENT DOCUMENTS

| | | | | |
|---|---|---|---|---|
| 5,973,791 A | * | 10/1999 | Yamamuro | H04N 1/32064 358/400 |
| 7,552,381 B2 | * | 6/2009 | Barrus | G06F 17/30011 358/464 |
| 2002/0052922 A1 | * | 5/2002 | Matsuura | H04L 51/066 709/206 |
| 2003/0101199 A1 | * | 5/2003 | Briggi | G06F 17/30011 |
| 2003/0217034 A1 | * | 11/2003 | Shutt | G06F 17/30011 |
| 2004/0218226 A1 | * | 11/2004 | Antognini | H04N 1/00209 358/402 |

(Continued)

FOREIGN PATENT DOCUMENTS

| | | |
|---|---|---|
| JP | S62-186661 A | 8/1987 |
| JP | H9-046372 A | 2/1997 |
| JP | 2009-164719 A | 7/2009 |

*Primary Examiner* — Beniyam Menberu
(74) *Attorney, Agent, or Firm* — Scully, Scott, Murphy & Presser, P.C.

(57) ABSTRACT

A mediation server may receive image data from a scanner via a network, the image data being generated by the scanner scanning each of M pieces of manuscripts sequentially, analyze the image data so as to specify separation image data which is a part of the image data, the separation image data representing a predetermined separation manuscript, and send first target data to a first destination and second target data to a second destination via the network, the first target data being obtained by using first partial image data representing at least one piece of manuscript among one or more pieces of manuscripts to be scanned after the separation manuscript, the second target data being obtained by using second partial image data representing at least one piece of manuscript among one or more pieces of manuscripts to be scanned before the separation manuscript.

15 Claims, 8 Drawing Sheets

(56) References Cited

U.S. PATENT DOCUMENTS

| | | | | |
|---|---|---|---|---|
| 2005/0200906 A1* | 9/2005 | Tanimoto | ........... | H04N 1/00222 358/400 |
| 2006/0126101 A1* | 6/2006 | Shutt | .................. | H04N 1/32614 358/1.15 |
| 2006/0158700 A1* | 7/2006 | Byun | ................. | H04N 1/00681 358/474 |
| 2006/0262995 A1* | 11/2006 | Barrus | .............. | G06F 17/30716 382/317 |
| 2008/0186535 A1* | 8/2008 | Maeda | ................. | H04N 1/0001 358/1.15 |
| 2010/0231961 A1* | 9/2010 | Fukushima | ........ | H04N 1/00222 358/1.15 |
| 2010/0245929 A1* | 9/2010 | Gopalasamy | ...... | H04N 1/00209 358/402 |
| 2013/0100501 A1* | 4/2013 | Chen | .................... | H04N 1/0036 358/3.28 |
| 2016/0321018 A1* | 11/2016 | Okabe | ...................... | H04N 1/10 |

* cited by examiner

FIG. 8
(1) Case B1 to B3
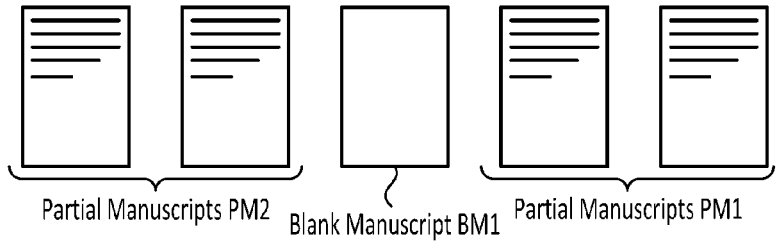
(2) Case C1, C2
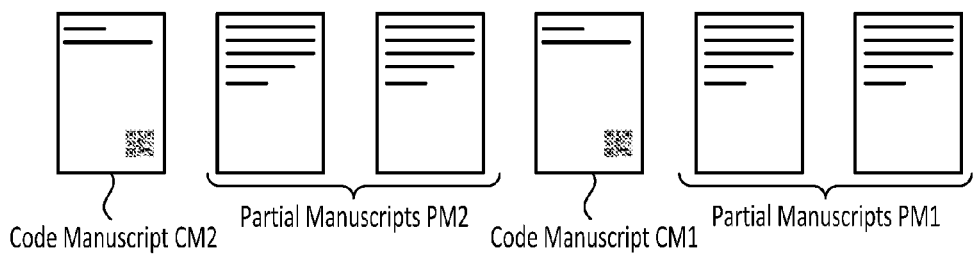
(3) Check Information = "Yes"
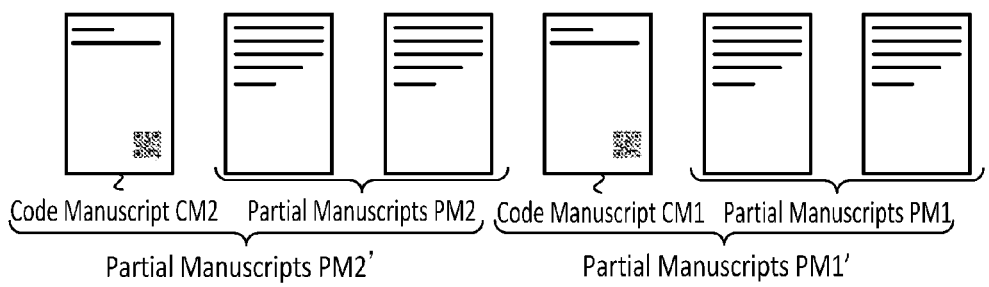
(4) Modification
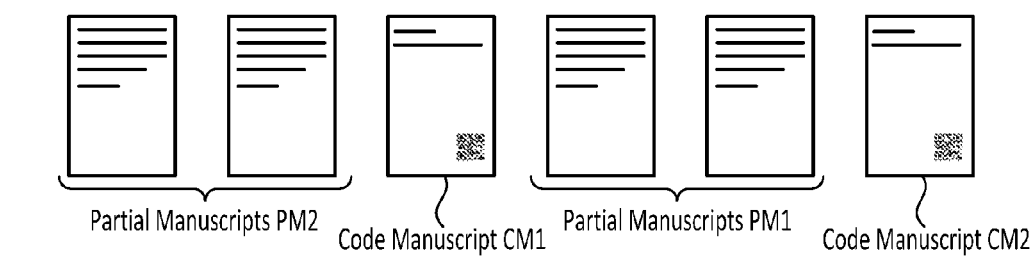
(5) Modification
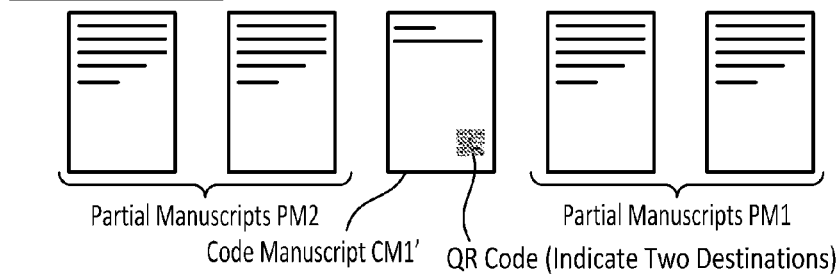

MEDIATION SERVER

TECHNICAL FIELD

The present disclosure relates to a mediation server capable of sending target data obtained by using image data generated by a scanner to a destination.

DESCRIPTION OF RELATED ART

With a known facsimile machine, in a case where a first manuscript among a plurality of manuscripts to be faxed is a destination sending manuscript that describes a destination in a predetermined part thereof, the facsimile device recognizes the destination in the destination sending manuscript, and sends image data representing each of the manuscripts to the destination. Further, in a case where the first manuscript is the destination sending manuscript, and a manuscript inserted among the rest of the plurality of manuscripts is another destination sending manuscript, the facsimile machine sends first image data representing each of manuscripts from the first manuscript to a manuscript immediately before the above another destination sending manuscript to a first destination described in the first manuscript, and sends second image data representing each of the manuscripts from the above another destination sending manuscript to a second destination described in the above another destination sending manuscript.

SUMMARY

In the above-described technique, a special facsimile machine is required that is capable of specifying the destination sending manuscripts and separating image data representing the plurality of manuscripts into the first image data and the second image data in order to send the first image data to the first destination and the second image data to the second destination respectively among the image data. Further, also in a case where the above-described technique is applied to a scanner, a special scanner is required that is capable of separating image data into first and second image data.

The disclosure herein provides a technique for sending two or more target data in a state where image data representing a plurality of manuscripts is separated into two or more target data, without using a special scanner.

A mediation server herein disclosed may comprise: a processor; and a memory configured to store computer-readable instructions therein, the computer-readable instructions, when executed by the processor, causing the mediation server to perform: sending a scan instruction to a scanner via a network; receiving image data from the scanner via the network in response to sending the scan instruction, the image data being generated by the scanner scanning each of M (the M being an integer of 3 or larger) pieces of manuscripts sequentially; analyzing the image data so as to specify separation image data which is a part of the image data, the separation image data representing a predetermined separation manuscript to be scanned m-th (the m being an integer of 2 or larger and smaller than M) among the M pieces of the manuscripts, the separation manuscript being for separating one or more pieces of manuscripts to be scanned after the separation manuscript and one or more pieces of manuscripts to be scanned before the separation manuscript; and sending first target data to a first destination and second target data to a second destination via the network in a specific state where the first target data and the second target data which are obtained by using the image data are divided, the first target data being obtained by using first partial image data which is a part of the image data, the first partial image data representing at least one piece of manuscript among the one or more pieces of manuscripts to be scanned after the separation manuscript, the second target data being obtained by using second partial image data which is a part of the image data, the second partial image data representing at least one piece of manuscript among the one or more pieces of manuscripts to be scanned before the separation manuscript.

A control method for implementation of the above-described mediation server, and, a non-transitory computer-readable recording medium in which computer-readable instructions are stored, are also novel and useful.

BRIEF DESCRIPTION OF THE DRAWINGS

FIG. 8 shows a schematic diagram indicating a plurality of variations for separating a plurality of manuscripts.

EMBODIMENT (Configuration of Communication System 2: FIG. 1)

Figure 1:
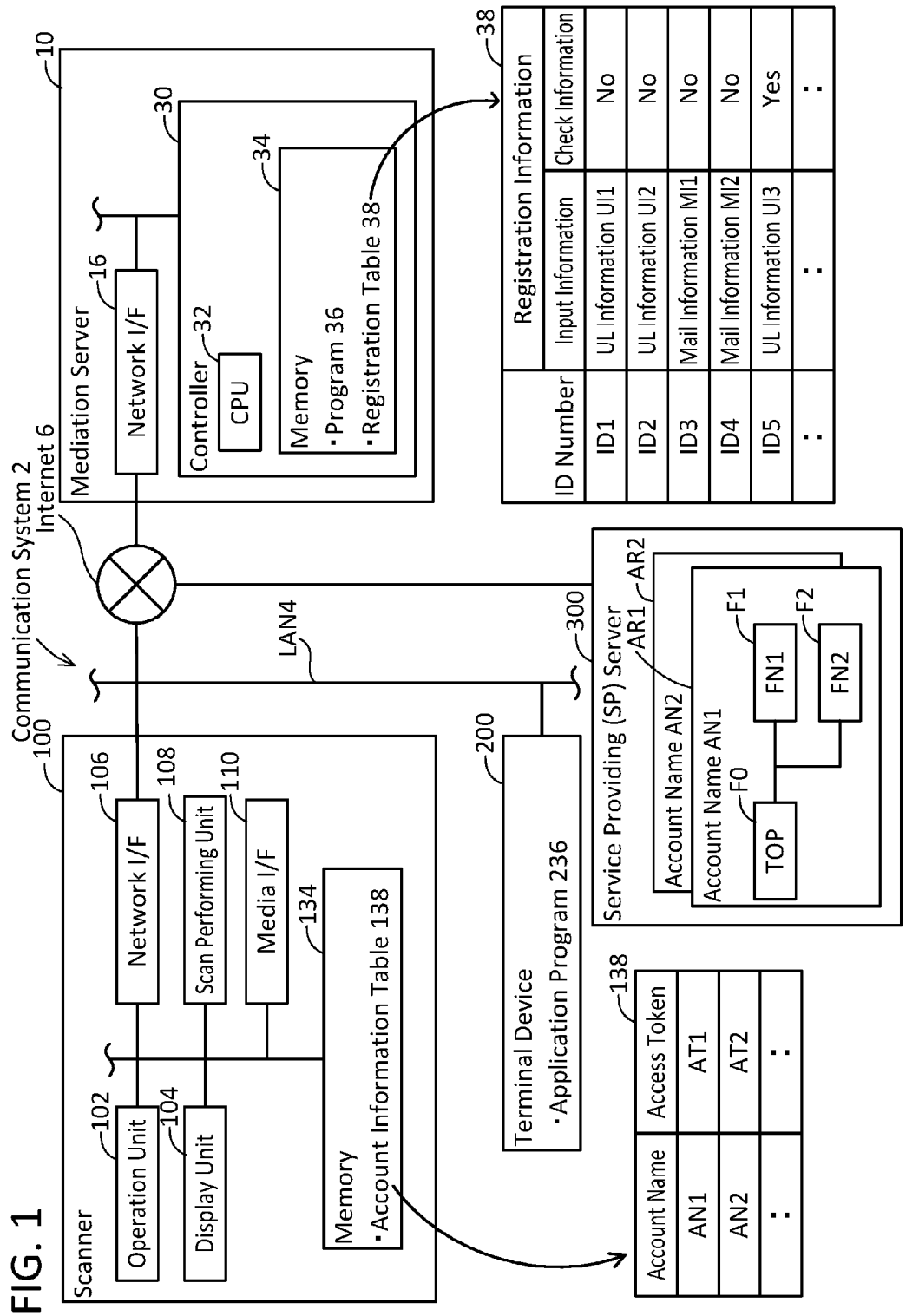
FIG. 1 shows a configuration of a communication system.

A configuration of a communication system 2 will be explained with reference to FIG. 1. The communication system 2 comprises a mediation server 10, a scanner 100, a terminal device 200, and a service providing server (called SP (abbreviation of "Service Provider") server below) 300. The devices 100 and 200 are mutually communicable via a LAN (abbreviation of "Local Area Network") 4. The LAN 4 is connected to the Internet 6. The mediation server 10 and the SP server 300 are communicable with each of the devices 100 and 200 via the Internet 6.

(Configuration of Scanner 100)

The scanner 100 is a peripheral device having a scan function (i.e., a peripheral device of the terminal device 200 that belongs to the same LAN as the scanner 100). The scanner 100 comprises an operation unit 102, a display unit 104, a network interface 106, a scan performing unit 108, a media interface 110, and a memory 134. The interface will be called "I/F" below. Each of the units 102 to 134 is connected to a bus line (reference number omitted).

The operation unit 102 comprises a plurality of keys. A user is able to input various kinds of instructions into the scanner 100 by operating the operation unit 102. The display unit 104 is a display for displaying various kinds of information. The display unit 14 is a so-called touch panel. That is, the display unit 14 functions as an operation unit that is operated by a user as well.

The network I/F 106 is an interface for performing a wired communication, and is connected to the LAN 4. Alternatively, in a modification, the network I/F 106 may be an interface for performing a wireless communication, and in this case the LAN 4 may be a so-called wireless LAN. The scan performing unit 108 is a scan mechanism such as a CCD (abbreviation of "Charge Coupled Device"), CIS (abbreviation of Contact Image Sensor), etc. The media I/F 110 is an interface for connecting a storage medium such as memory card, USB memory, hard disk, etc.

The memory 134 is constituted of a volatile memory, a non-volatile memory, etc. The memory 134 stores an account information table 138. The account information table 138 stores an account name for using a service of the SP server 300 and an access token being authentication information for using the SP server 300 in association.

(Configuration of Terminal Device 200)

The terminal device 200 is a user terminal such as a desktop PC (abbreviation of personal computer), a note PC, a tablet PC, a mobile phone, a smart phone, etc. The terminal device 200 stores an application program 236 (called "app 236" below). The app 236 is a program provided by a vendor of the scanner 100, and is a program for performing processes related to the scanner 100. The app 236, for example, may be installed in the terminal device 200 from a server on the Internet provided by the vendor (not shown), or may be installed into the terminal device 200 by a medium shipped together with the scanner 100.

(Configuration of SP Server 300)

The SP server 300 is, for example, a known SP server such as a "Google (registered trademark) Drive", "Evernote (registered trademark)", "Dropbox (registered trademark)" etc. The SP server 300 can provide an upload service for receiving data from a communication device (i.e., scanner 100) and storing the same.

A user of the SP server 300 registers account information (i.e., account name, password etc.) in the SP server 300 in order to use the service of the SP server 300. When the account information is registered, the SP server 300 determines a storage area (e.g., AR1, AR2) corresponding to the registered account name (e.g., AN1, AN2). For example, the storage area AR1 includes a top folder F0, and subordinate folders thereof F1 and F2. Names of the folders F1 and F2 are FN1 and FN2, respectively.

(Configuration of Mediation Server 10)

The mediation server 10 is a server provided by the vendor of the scanner 100, and is a server capable of sending image data generated by the scanner 100 to various destinations. The mediation server 10 comprises a network I/F 16 and a controller 30. The controller 30 comprises a CPU 32 and a memory 34. The CPU 32 performs various processes in accordance with a program 36 stored in the memory 34. The memory 34 is composed of a volatile memory, a non-volatile memory, etc. Aside from the program 36, the memory 34 stores a registration table 38. It should be noted that in a modification the registration table 38 may be stored in an external device communicably connected to the mediation server 10 (e.g., a memory, server etc.).

One or more pieces of registration information are stored in the registration table 38. The registration information includes input information and check information. The input information is upload information (called "UL information" below) or mail information. The UL information includes a folder name indicating a folder in the SP server 300, and a pre-fix of a file name to be named on a file to be uploaded in the folder name. The mail information includes a mail address indicating a destination of an e-mail, a message text, and a mail title. The check information is information indicating whether check has been done in a check box CB1 in a setting screen SC1 (or SC2) of FIG. 2 to be described later. Each identification number for identifying the registration information is associated to the corresponding registration information (e.g., ID1).

(Advance Preparation of User of Scanner 100)

The user of the scanner 100 needs to make the following advance preparation in order for the scanner 100 to receive services from the SP server 300. The user, for example, accesses the mediation server 10 by using the terminal device 200, and selects an item "acquisition of authentication information" from a menu screen obtained from the mediation server 10. Due to this, the mediation server 10 sends a specific URL for accessing the SP server 300 to the terminal device 200. The user accesses the SP server 300 from the terminal device 200 by using the specific URL. Next, the user performs authentication procedure by inputting the account information to the SP server 300 via the terminal device 200. If the authentication succeeds, the SP server 300 generates an access token for the user, stores an account name included in the above-described account information and the account token in association, and further sends the access token to the mediation server 10. When the access token from the SP server 300 is received, the mediation server 10 generates a temporary ID, which is sent to the terminal device 200. Due to this, the temporary ID is displayed on the terminal device 200. The user can know the temporary ID displayed on the terminal device 200.

Next, the user inputs the account name and the temporary ID to the scanner 100 by operating the operation unit 102 of the scanner 100. In this case, the scanner 100 sends the temporary ID to the mediation server 10. Due to this, the mediation server 10 sends the access token to the scanner 100.

When each of the above-described processes is performed, the scanner 100 can cause the account name and the access token to be registered in the account information table 138.

Figure 2:
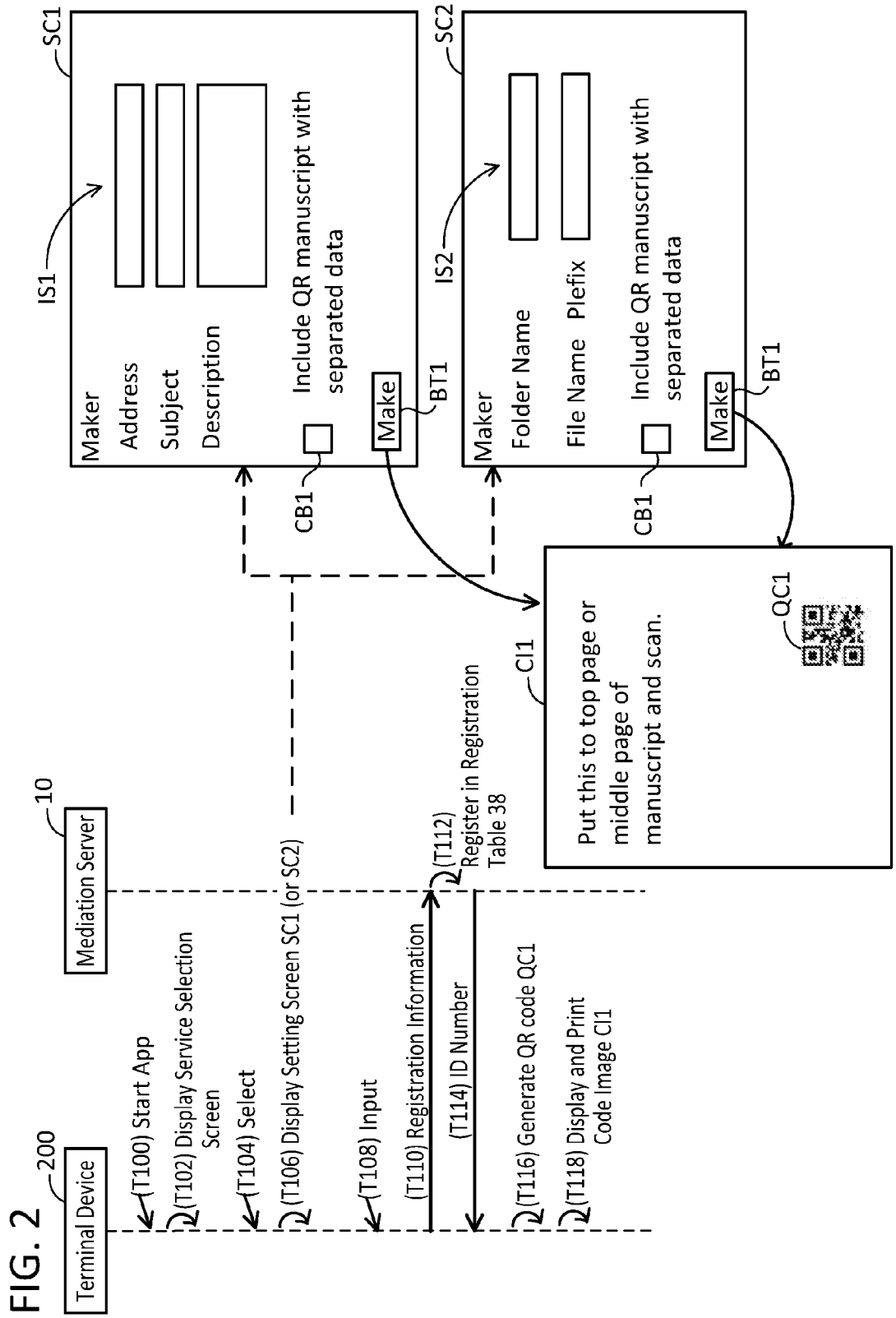
FIG. 2 shows a sequence diagram of a code generation process.

(Code Generation Process: FIG. 2)

With reference to FIG. 2, code generation process for registering registration information in the registration table 38 of the mediation server 10, and generating image data representing a code image related to the registration information, will be described.

In T100 the terminal device 200 starts the app 236 in response to accepting the user operation. The terminal device 200 performs each of the following processes in accordance with the app 236. In T102, the terminal device 200 displays a service selection screen for selecting a mail sending service or uploading service. When in T104 the terminal device 200 accepts the operation of selecting the mail sending service, the terminal device 200 displays a setting screen SC1 in T106. Alternatively, when in T104 the terminal device 200 accepts the operation of selecting the uploading service, the terminal device 200 displays a setting screen SC2 in T106.

The setting screen SC1 includes an input section IS1 for inputting mail information to be used for mail sending service (i.e., mail address, mail title, and message text), a check box CB1, and a button BT1. The check box CB1 is a box for selecting whether the user causes the mediation server 10 to perform sending of the image data representing a code manuscript including the code image. In a case where the check box CB1 is checked, sending of the image data representing the code manuscript is performed, whereas in a case where the check box CB1 is not checked, the sending of the image data representing the code manuscript is not performed.

In T108 the terminal device 200 accepts input of the mail information to the input section IS1 in the setting screen SC1, and in T110 sends registration information including the inputted mail information and check information to the mediation server 10 in response to accepting the operation for selecting the button BT1.

In T112 the CPU 32 of the mediation server 10 generates a new identification number, and registers the identification number and the received registration information in the registration table 38 in association. In T114 the CPU 32 sends the identification number to the terminal device 200.

In T116 the terminal device 200 generates a QR code (registered trademark) QC1 by encoding the received identification number. Amount of information that can be encoded is limited. Accordingly, if a configuration of encoding the mail information itself is adopted, there is a possibility that all of the mail information cannot be appropriately encoded. Contrary to this, in this embodiment, since the configuration of encoding the identification number having smaller amount of information than the mail information is adopted, encoding can be appropriately performed. It should be noted that in a modification the code image may not be the QR code, and for example, may be an image representing the other kinds of codes such as a one-dimensional bar code.

In T118, the terminal device 200 displays a code image CI1 including the generated QR code QC1 and a predetermined message, and when an instruction for printing the code image CI1 is accepted, it sends code image data representing the code image CI1 to a printer (not shown). As a result of this, the code image CI1 is printed. Due to this, the user can obtain a code manuscript including the code image CI1. The above-described predetermined message is a message for promoting the user to initiate scan of a plurality of manuscripts in a state where the code manuscript is placed as a top page or as one of pages following the top page of the manuscripts.

The setting screen SC2 includes an input section IS2 for inputting UL information to be used for uploading service (i.e., folder name, prefix of the file name), the check box CB1, and the button BT1. The folder name indicates a folder in the SP server 300 in which the image data is to be uploaded. For example, when a user operation for accessing the SP server 300 is accepted, the terminal device 200 displays a screen including a list of each folder name of each folder in the storage area corresponding to the account name of the user. Then the user copies the desired folder name among the list, and pastes the folder name in the input section IS2. Due to this, the folder name is inputted in the input section IS2. The prefix of the file name is a top character string of the name of the file including data to be sent. For example, in a case where a character string "work" is inputted, a file name of a file including data to be sent is "work_20160603100235_001.pdf" etc. The file name "work_20160603100235_001.pdf" is a character string in which the character string "work" is added at the beginning, and a serial number "001" is added at the ending of the character string "20160603100235" representing a time stamp indicating date and time when the file is sent. It should be noted that in a modification, a character string in the middle or at the ending of the file name may be inputted in the input section IS2. Generally, a prefix of a file name is a part of a character string of a name of a file including data to be sent.

In T108 the terminal device 200 accepts input of the folder name and the prefix of the folder name to the input section IS2 in the setting screen SC2, and in T110, it sends registration information including the inputted folder name, the prefix of the inputted folder name, and check information to the mediation server 10 in response to accepting the operation for selecting the button BT1. Then, the processes of T112 to T118 are performed similarly to the case where the setting screen SC1 is displayed in T106.

Figure 3:
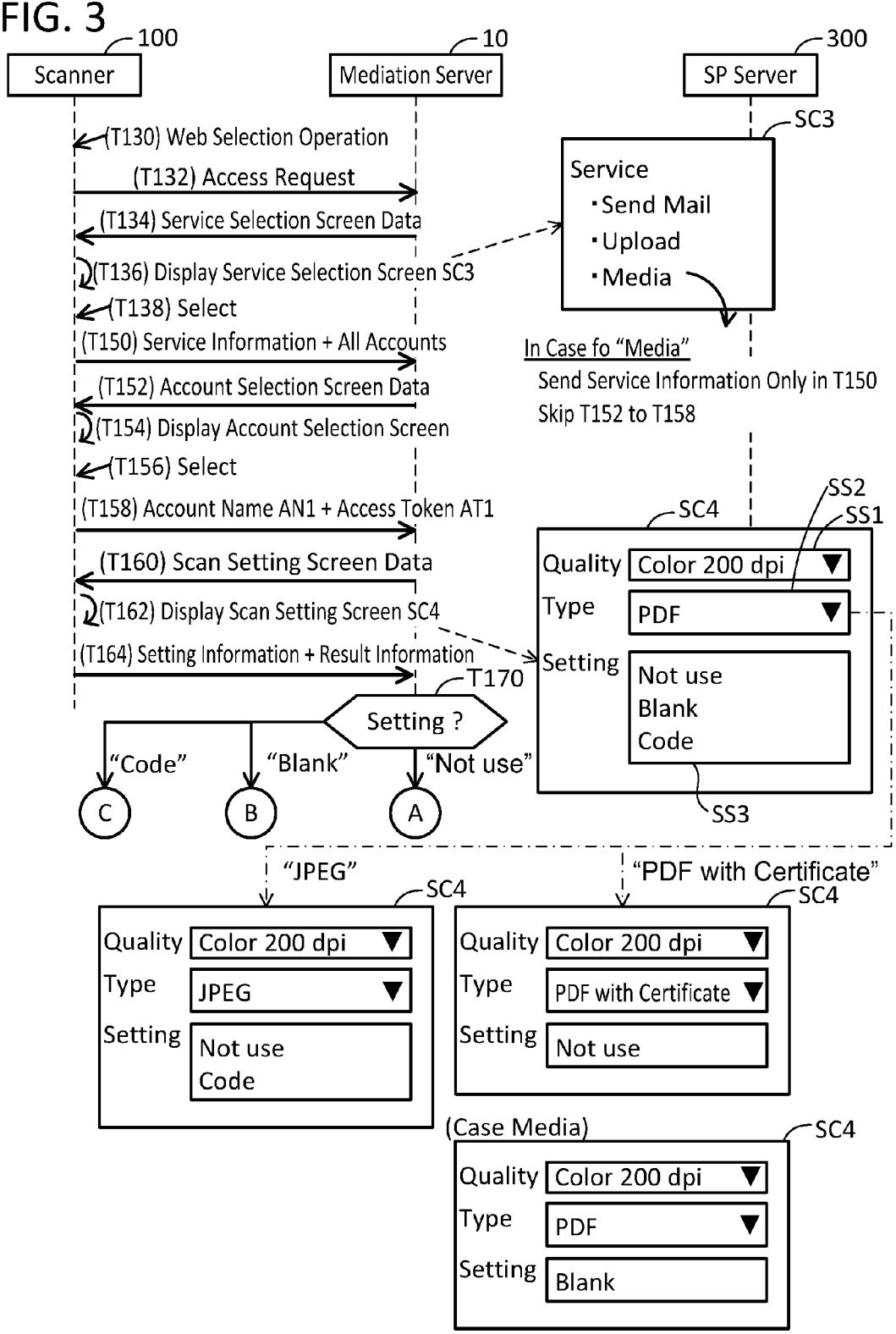
FIG. 3 shows a sequence diagram of a mediation process.

(Mediation Process: FIG. 3)

A mediation process in which the mediation server 10 receives image data generated by the scanner 100 and sends data obtained by using the image data to a destination, will be described with reference to FIG. 3. In this embodiment a situation where one-side scan is performed by the scanner 100 is assumed, however in a modification, both-side scan may be performed.

In T130 the scanner 100 accepts a web selection operation via the operation unit 102. The web selection operation is an operation for accessing the mediation server 10 on the Internet 6. In T132 the scanner 100 sends access request for accessing the mediation server 10 to the mediation server 10.

In T134 the CPU 32 of the mediation server 10 sends to the scanner 100 service selection screen data representing a service selection screen SC3 as a response to the access request. The service selection screen SC3 is a screen for selecting a desired service among a mail sending service, uploading service, and media service. The media service is a service for storing the image data in a media.

In T136 the scanner 100 causes the display unit 104 to display the service selection screen SC3, and in T138 accepts an operation for selecting one service among three services in the service selection screen SC3. In a case where the mail sending service or the uploading service is selected, in T150 the scanner 100 sends service information indicating the selected service, and all of the account names AN1, AN2 registered in the account information table 138 etc. to the mediation server 10. On the other hand, in a case where the media service is selected, in T150 the scanner 100 sends only service information indicating the media service to the mediation server 10. In this case, processes in T152 to T158 to be described later are skipped, and a process in T160 is performed.

In T152 the CPU 32 generates account selection screen data representing the account selection screen including each of the received account names AN1, AN2 etc., and sends the image data to the scanner 100. The account selection screen is a screen for selecting one account name among the account names AN1 and AN2.

In T154 the scanner 100 causes the display unit 104 to display the account selection screen, and in T156 accepts the selection of the account name AN1. In this case, in T158 the scanner 100 acquires the access token AT1 associated with the selected account name AN1 from the access information table 138, and sends the account name AN1 and the access token AT1 to the mediation server 10.

In T160 the CPU 32 sends the scan setting screen data representing a scan setting screen SC4 to the scanner 100. The scan setting screen SC4 includes a selection section SS1 for selecting a number of colors of scan and a resolution of scan, a selection section SS2 for selecting a file format of the image data generated by the scan, and a selection section SS3 for selecting whether sending of the image data by using a blank manuscript or a code manuscript is to be performed.

The selection section SS2 includes a PDF (abbreviation of "Portable Document Format") file, a PDF file with certificate, and a JPEG file as its options. In a case where a plurality of manuscripts is scanned, the PDF file is one file including all of the image data representing the plurality of manuscripts, and is a file having a concept of pages. In a case where a plurality of manuscripts is scanned, one JPEG file is generated for each manuscript. That is, the JPEG file does not have the concept of pages, and a number of JPEG files is equal to a number of manuscripts to be scanned.

The selection section SS3 includes an item "not use", an item "blank", and an item "code". The item "not use" indicates that sending of image data by using a blank manuscript or a code manuscript is not performed, and sending of the image data without using the blank manuscript and the code manuscript (called "normal sending" below) is to be performed. The item "blank manuscript" indicates that sending of the image data using the blank manuscript (called "blank sending" below) is to be performed. Specifically, the blank sending means that in a case where a plurality of manuscripts is scanned in a state where a blank manuscript is inserted among the plurality of manuscripts, the image data is sent to the same destination in a state where the image data is divided into image data representing manuscripts scanned before the blank manuscript, and image data representing manuscripts scanned after the blank manuscript. The item "code" indicates that sending of the image data using the code manuscript (called "code sending" below) is to be performed. Specifically, the code sending means that in a case where a plurality of manuscripts is scanned in a state where a code manuscript (see a manuscript representing CI1 of FIG. 2) is included at the beginning as the top page or inserted among the rest of the plurality of manuscripts, the image data representing manuscripts scanned after the code manuscript is sent to a destination corresponding to the QR code QC1 in the code manuscript. It should be noted that the scan setting screen data is configured such that the options in the selection section SS3 are changed in accordance with the file format selected in the selection section SS2. Next, this point will be described in detail.

In T162 the scanner 100 causes the display unit 104 to display the scan setting screen SC4 in accordance with the scan setting screen data. The scanner 100 displays the selection section SS3 including all of the three items (i.e., "not use", "blank", and "code") as options in a state where the PDF file is selected in the selection section SS2. Further, the scanner 100 displays, in a state where the PDF file with certificate is selected in the selection section SS2, the selection section SS3 including only the item "not in use". The PDF file with certificate includes a hash obtained from the image data, a time stamp etc. Although it will be described in detail later, the PDF file generated by the scanner 100 is different from the PDF file sent from the mediation server 10 in the blank sending or the code sending. In this case, the certificate that includes the hash, time stamp etc. corresponding to the former PDF file does not support the latter PDF file. Accordingly, in the present embodiment, in order to effectively use the certificate corresponding to the former PDF file, the selection section SS3 including only the item "not use" is displayed so as not to perform the blank sending or the code sending in a case where a PDF file with a certificate is selected.

Further, the scanner 100 displays, in a state where the JPEG file is selected in the selection section SS2, the selection section SS3 not including the item "blank" but including the items "not use" and "code" is displayed. As described above, in the blank sending, more than two pieces of image data are sent to the same destination. Further, since the JPEG file does not have the concept of pages, a plurality of JPEG files is generated by scanning a plurality of manuscripts. For example, a case is assumed where among a plurality of JPEG files each of files representing each of manuscripts scanned before the blank manuscript is sent to, for example, one folder, and further each of files representing each of manuscripts scanned after the blank manuscript is sent to the same folder. In this case, each of the former files and the latter files are not stored in a divided state in the folder. Accordingly, since there is no merit in performing the blank sending of the JPEG file, the selection section SS3 not including the item "blank" is displayed in a state where the JPEG file is selected in the selection section SS2.

It should be noted that in a case where service information indicating the media service is received in T150, the CPU 32 sends the scan setting screen data representing the scan setting screen SC4, which includes the selection section SS3 with only the item "blank" included therein, to the scanner 100. Since in the media service the destination of the image data is the media connected to the scanner 100, and since the destination corresponding to the code image has no use in this case, the scan setting screen SC4 is configured such that the item "code" is not selected. Further, it is not necessary to use the mediation server 10 in order to store the image data generated by the scanner 100 in the media as it is. That is, the scanner 100 only has to generate image data and store the image data in the media, in a case where an operation for storing the image data in the media is accepted. Accordingly, since there is no merit in performing the normal sending by using the mediation server 10, the scan setting screen SC4 is configured such that the item "not use" is not selected.

In T164, the scanner 100 sends the setting information indicating the scan setting selected in the selection sections SS1 and SS2 of the scan setting screen SC4 and result information indicating the selection result in the selection section SS3 to the mediation server 10.

In T 170, the CPU 32 specifies the selection result indicated by the received result information. The CPU 32 performs processes related to the normal sending shown in FIG. 4 in a case where the selection result indicates the item "not use", performs processes related to the blank sending shown in FIG. 5 in a case where the selection result indicates the item "blank", and performs processes related to the code sending shown in FIGS. 6 and 7 in a case where the selection result indicates the item "code".

Figure 4:
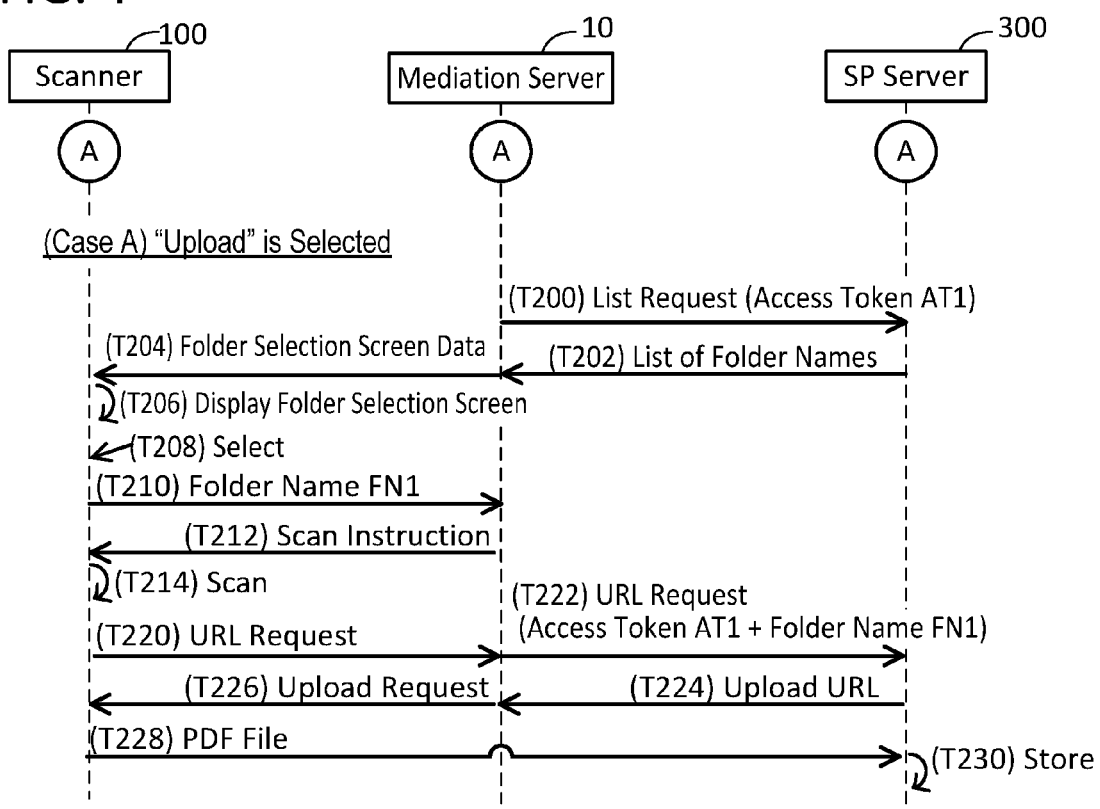
FIG. 4 shows a sequence diagram regarding a normal sending of Case A.

(Processes Related to Normal Sending: FIG. 4)

Contents of the processes related to the normal sending will be explained with reference to FIG. 4. Here, case A where the uploading service is selected in the service selection screen SC3 of FIG. 3 will be explained. In this embodiment, "PDF" is selected in the selection screen SS2 of the scan setting screen SC4.

In T200, the CPU 32 of the mediation server 10 sends a list request including the access token AT1 received in T158 of FIG. 3 to the SP server 300. Due to this, authentication of the access token AT1 is performed in the SP server 300. When the authentication succeeds, the CPU 32 receives a list of each of the names FN1, FN2 etc. of each of the folders F1, F2 etc. in the storage area AR1 corresponding to the account name AN1 from the mediation server 10 in T202. Further, in T204, the CPU 32 generates folder selection screen data representing folder selection screen including the list of the received folder names, and sends the screen data to the scanner 100. The folder selection screen is a screen for selecting a desired folder name of the list of the folder names.

In T206, the scanner 100 causes the display unit 104 to display the folder selection screen, and in T208 accepts selection of the folder name FN1. In this case in T210 the scanner 100 sends the folder name FN1 to the mediation server 10.

In T212, the CPU 32 send the scan instruction to the scanner 100 in response to receiving the folder name FN1 from the scanner 100. The scan instruction includes the setting information received in T164 of FIG. 3.

In T214, the scanner 100 performs scan of one or more manuscripts in accordance with the number of colors and the resolution as set in the setting information included in the scan instruction, and generates the PDF file having a file format "PDF" as set in the setting information. The PDF includes the image data representing the above-described one or more manuscripts. Then in T220 the scanner 100 sends URL (abbreviation of "Uniform Resource Locator") request to the mediation server 10. The URL request is a request for acquiring the URL of the destination to which the PDF file is to be sent.

In T222, when the CPU 32 receives the URL request from the scanner 100, the CPU 32 sends the URL request including the access token AT1 and the folder name FN1 to the SP server 300. Due to this, the authentication of the access token AT1 is performed in the SP server 300. If the authentication succeeds, in T224 the CPU 32 receives an upload URL, which is a URL of the folder F1 indicated by the folder name FN1, from the mediation server 10. Then in T226, the CPU 32 sends the upload request including the upload URL to the scanner 100 without receiving the PDF file from the scanner 100. The upload request is a request for causing the scanner 100 to perform uploading of the PDF file.

In T228, the scanner 100 sends the PDF file, which designates the upload URL in the upload request as a destination, to the SP server 300 without sending it through mediation of the mediation server 10. Due to this, in T230 the PDF file is stored (i.e., uploaded) in the folder F1 of the SP server 300.

In this case the PDF file is sent to the SP server 300 without sending it through the mediation of the mediation server 10. For example, if a configuration that the PDF file is sent to the SP server 300 via the mediation server 10 is adopted, since data representing a private manuscript of a user is received by the mediation server 10, which may make the user feel insecure. In this embodiment, since the PDF file is sent to the SP server 300 without sending it through the mediation of the mediation server 10, it can prevent giving the user the insecure feeling.

It should be noted that in a case where the PDF with certificate is selected in the selection section SS2 of the scan setting screen SC4 of FIG. 3, the scanner 100 generates the certificate, and generates the PDF with the certificate in T214. Then in T228 the scanner 100 sends the PDF including the certificate to the SP server 300. Further, in a case where the JPEG is selected in the selection section SS2 of the scan setting screen SC4 of FIG. 3, the scanner 100 sends one or more JPEG files representing one or more manuscripts to the SP server 300 in T228.

Further, in a case where the mail sending is selected in the service selection screen SC3 of FIG. 3, the following processes are performed instead of processes of T200 to T228. That is, the CPU 32 sends input screen data for inputting mail information (i.e., mail address, title, and message text) to the scanner 100, and receives the mail information inputted by the user from the scanner 100. Then, the CPU 32 sends the same scan instruction as that in T212 to the scanner 100, and receives the PDF file from the scanner 100. Next, the CPU 32 generates an e-mail describing the title and the message text in the mail information, and attaches the PDF file to the e-mail. Then the CPU 32 sends the e-mail with the PDF file attachment to the mail address in the mail information as a destination.

Figure 5:
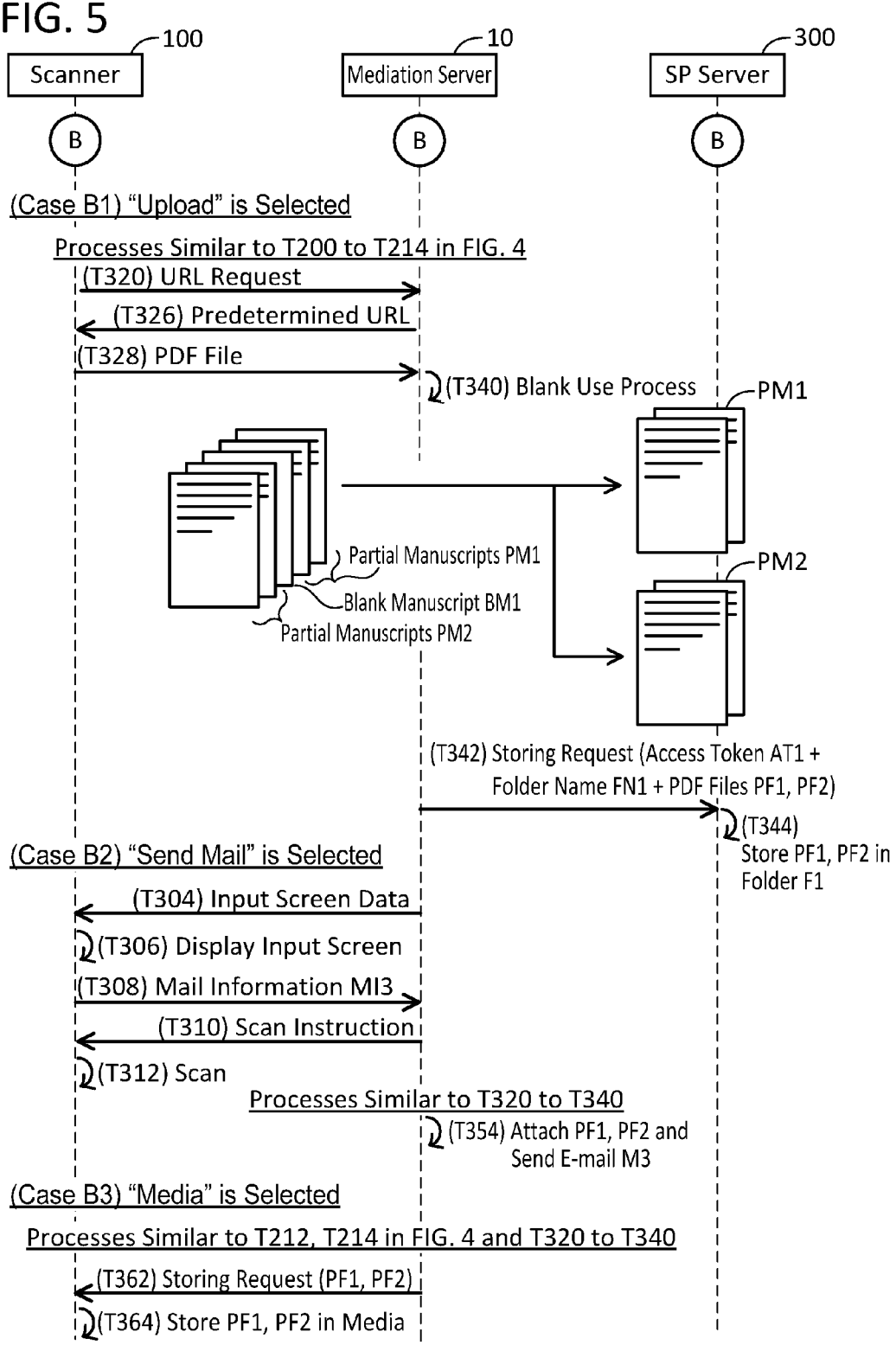
FIG. 5 shows a sequence diagram of Cases B1 to B3, in which a blank manuscript is used.

(Processes Related to Blank Sending: FIG. 5)

The processes related to the blank sending will be described with reference to FIG. 5. The PDF is selected in the selection screen SS2 of the scan setting screen SC4 of FIG. 3 in the following cases B1 to B3.

(Case B1: Upload Service Selected)

Case B1 where the upload service is selected in selection screen SC3 of FIG. 3 will be described. First, the same processes in T200 to T214 of FIG. 4 are performed. In this case, scan of each of five manuscripts including a blank manuscript is performed sequentially. The manuscripts include the blank manuscript to be scanned third, two partial manuscripts PM1 to be scanned after the blank manuscript, and two partial manuscripts PM2 to be scanned before the blank manuscript. The blank manuscript is a white manuscript on which nothing is described, and is a manuscript for separating the partial manuscripts PM1 and PM2.

In T320, the CPU 32 of the mediation server 10 receives the URL request from the scanner 100, and in T326, it sends a predetermined URL in the mediation server 10 to the scanner 100. The predetermined URL is a URL indicating that a blank-using process in T 340 is to be performed when the image data designating the URL designated as a destination is received.

In T328, the scanner 100 sends one PDF file including image data for five pages representing the above-described five-page manuscripts to the mediation server 10 with the received predetermined URL designated as a destination.

In T 340, the CPU 32 performs the blank-using process. In this process, the CPU 32 analyses the image data in the PDF file to specify partial image data for one page representing the blank manuscript, i.e., partial image data for one page representing a totally white image. Specifically, the CPU 32 specifies partial image data having a rate of pixels representing a white pixel value equal to or more than the threshold value (e.g., 95% or higher) as the partial image data representing the blank manuscript. The CPU 32 further specifies partial image data after the specified partial image data as partial image data representing the partial manuscripts PM1, and specifies partial image data before the specified partial image data as partial image data representing the partial manuscripts PM2. Then, the CPU 32 generates a PDF file PF1 including the partial image data representing the partial manuscripts PM1, and a PDF file PF2 including the partial image data representing the partial manuscripts PM2. Here, the CPU 32 generates each of names of files PF1 and PF2 such that the names of files PF1 and PF2 are different from each other, and attaches each of the file names to corresponding one of the files PF1 and PF2. For example, the CPU 32 may generate a first file name by adding a number "1" to the file name of the PDF file received in T328, and further may generate a second file name by adding number "2" to the file name of the PDF. It should be noted that in a modification where both-side scan is performed the CPU 32 may specify both-side image data for two pages representing both sides of the blank manuscript. Then, the CPU 32 may specify partial image data for pages after the both-side image data as partial image data representing the partial manuscripts PM1, and may specify partial image data for pages before the both-side image data as partial image data representing the partial manuscripts PM2. In a case where the check box CB1 of FIG. 2 is checked, the CPU 32 may not send the both-side image data.

In T342, the CPU 32 sends a storing request including the access token AT1 received in T158 of FIG. 3, the folder name FN1 received in T210 (see FIG. 4), and two PDF files PF1, PF2 generated in T340 to the SP server 300. The storing request is a request for storing two files PF1 and PF2 in the folder F1 having the folder name FN1. That is, two PDF files PF1 and PF2 are sent to the same destination folder F1. Due to this, in T344 the two PDF files PF1 and PF2 are stored in the folder F1. Since the image data representing the blank manuscript is not stored in the folder F1, only the image data the user desires to store is stored in the folder F1.

(Case B2: Mail Sending Service Selected)

Case B2 where the mail sending service is selected in the service selection screen SC3 of FIG. 3 will be described. In this case, in T304 the CPU 32 sends input screen data representing an input screen for inputting the mail information (i.e., mail address, title, and message text) to the scanner 100. The input screen includes the input section same as the input section IS1 of the screen SC1 of FIG. 2.

In T306 the scanner 100 causes the display unit 104 to display the input screen, and in T308, it sends mail information MI3 inputted in the input screen to the mediation server 10.

Processes of T310 and T312 are the same as those of T212 and T214 of FIG. 4 respectively. Then the processes same as those in T320 to T340 are performed. Next, in T354, the CPU 32 generates an e-mail M3 in accordance with the mail information MI3. Specifically, the CPU 32 generates the e-mail M3 describing the title and the message text in the mail information MI3, and further attaches two PDF files PF1 and PF2 to the e-mail M3. Further, the CPU 32 sends the e-mail M3 to the mail address in the mail information MI3 as a destination.

(Case B3: Media Service Selected)

Case B where the media service is selected in the selection screen SC3 of FIG. 3 will be described. In this case the processes same as those in T212, T214 of FIG. 4 and T320 to T340 of FIG. 5 are performed. In T362 the CPU 32 sends the storing request including two PDF files PF1 and PF2 to the scanner 100. The storing request is a request for storing two PDF files PF1 and PF2 in the storage media connected to the media I/F 110 of the scanner 100. Due to this, in T364, the two PDF files PF1 and PF2 are stored in the storage media.

In each of the above-described Cases B1 to B3, the mediation server 10 analyzes the image data included in the PDF file received from the scanner 100, and specifies the partial image data representing the blank manuscript (T340). Then the mediation server 10 sends the PDF file PF1 including the partial image data representing partial manuscripts PM1 scanned after the blank manuscript and the PDF file PF2 including the partial image data representing partial manuscripts PM2 scanned before the blank manuscript to the same destination (i.e., a folder F1, mail address in the mail information MI13, or storage media in the scanner 100) (T342, T354, and T362). Due to this, the scanner can send two partial image data in a state where two partial image data obtained by using the image data in the PDF file is divided (i.e., in a state where the file is divided into two PDF files PF1 and PF2), without using a special scanner capable of specifying the partial image data representing the blank manuscript from among the image data in the PDF file.

Further, in this embodiment, a blank manuscript is adopted as a manuscript for separating the partial manuscript PM1 and the partial manuscript PM2. Due to this, the user does not need to prepare a special manuscript for separating the partial manuscript PM1 and the partial manuscript PM2, and may only prepare the blank manuscript. Due to this, user convenience can be improved.

Figure 6:
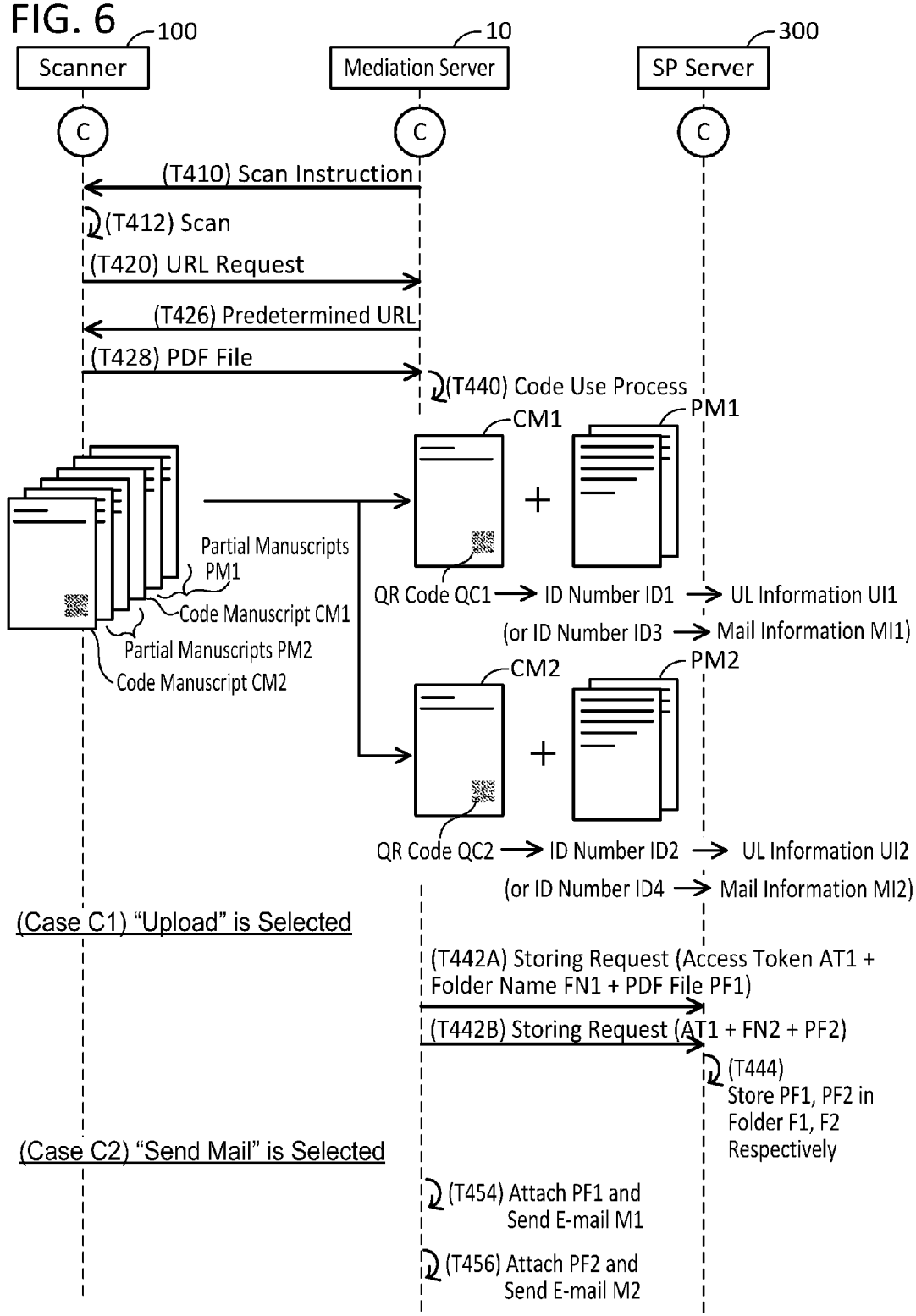
FIG. 6 shows a sequence diagram of Cases C1 and C2, in which a code manuscript is used.

(Processes Relating to the Code Sending: FIG. 6)

Processes relating to the code sending will be described with reference to FIG. 6. A PDF file is selected in the selection section SS2 in the scan setting screen SC4 of FIG. 3 in the following Cases C1 and C2.

(Case C1: Upload Service Selected)

Case C1 where the upload service is selected in the service selection screen SC3 will be described. The processes of T410 and T412 are the same as those of T212 and T214 of FIG. 4. Processes of T420 to T428 are the same as those of T320 to T328 of FIG. 5. It should be noted that a specific URL of T426 is different from a specific URL in T326 of FIG. 5, and is a URL indicating code-using process of T440 is to be performed when the image data designating the URL as a destination is received.

In this case, each of six manuscripts including two code manuscripts CM1 and CM2 are scanned sequentially. Each of the code manuscripts CM1 and CM2 are manuscripts obtained by the user as a result of the processes of FIG. 2. The above-described six manuscripts include the code manuscript CM2 to be scanned first, two partial manuscripts PM2 to be scanned after the code manuscript CM2, the code manuscript CM1, and two partial manuscripts PM1 to be scanned after the code manuscript CM1.

In T440, the CPU 32 performs the code-using process. The CPU 32 analyses the image data included in the PDF file to specify partial image data for one page representing code image including the QR code. Specifically, the CPU 32 performs pattern matching of features of the QR code (e.g., position detecting pattern at three corners) to specify the partial image data. In this case, the CPU 32 specifies the partial image data representing the code manuscript CM2 (i.e., image of page 1) to be scanned first and the partial image data representing the code manuscript CM1 (i.e., image of page 4) to be scanned fourth. The CPU 32 further specifies the partial image data representing images of page 2 and page 3 as the partial image data representing the partial manuscripts PM2, and specifies the partial image data representing images of page 5 and page 6 as the partial image data representing the partial manuscripts PM1. It should be noted in a modification where both-side scan is performed, the CPU 32 may specify first both-side image data for two pages representing both sides of the code manuscript CM1, and second both-side image data for two pages representing both sides of the code manuscript CM2. Then, the CPU 32 may specify partial image data representing images of pages, which is between the images for the two pages represented by the first both-side image data and the images for the two pages represented by the second both-side image data, as the partial image data representing the partial manuscripts PM2, and may specify images of pages that follow the two pages represented by the second both-side image data as the partial image data representing partial manuscripts PM1. The CPU 32 may not send the first and second both-side image data in a case where "checked state" is selected in the check box CB1 of FIG. 2

Next, the CPU 32 performs readout of the QR code QC1 from the partial image data representing the code manuscript CM1 to obtain the identification number ID1. Then the CPU 32 obtains the registration information associated with the identification number ID1 from the registration table 38 (see FIG. 1). The registration information includes the UL information UI1 and check information "no". Similarly, the CPU 32 performs readout of the QR code QC2 from the partial image data representing the code manuscript CM2 to obtain the identification number ID2, and obtains check information "no" and the UL information UI12 associated with the identification number ID2.

The check information "no" means that sending of the partial image data representing the code manuscript is not performed. Accordingly, the CPU 32 generates the PDF file PF1 including the partial image data representing the partial manuscripts PM1 but not including the partial image data representing the code manuscript CM1, and the PDF file PF2 including the partial image data representing the partial manuscript PM2 but not including the partial image data representing the code manuscript CM2. Here the CPU 32 gives a file name based on the prefix of the file name in the UL information UI1 to the PDF file PD1, and gives a file name based on the prefix of the file name in the UL information UI2 to the PDF file PD2.

In T442A, the CPU 32 sends a storing request including the access token AT1, the folder name FN1 in the UL information UI1, and the PDF file PF1 to the SP server 300. Further, in T442B, the CPU 32 sends a storing request including the access token AT1, the folder name FN2 in the UL information UI2, and the PDF file PF2 to the SP server 300. Due to this, in T444 the PDF file PF1 is stored in the folder F1 indicated by the folder name FN1, and the PDF file PF2 is stored in the folder F2 indicated by the folder name FN2.

(Case C2: Mail Sending Service Selected)

Case C2 where the mail sending service is selected in the service selection screen SC3 will be described. In this case C2, in T440, the CPU 32 obtains identification number ID3 from the QR code QC1, and obtains mail information MI1 associated with the identification number ID3. Further, the CPU 32 obtains identification number ID4 from the QR code QC2, and obtains mail information MI2 associated with the identification number IN.

In T454 the CPU 32 generates an e-mail M1 in accordance with the mail information MI1, and sends the e-mail M1 with the PDF file PF1 attachment to the mail address included in the mail information MI1 as a destination. Further in T456 the CPU 32 generates an e-mail M2 in accordance with the mail information MI2, and sends the e-mail M1 with the PDF file PF2 attachment to the mail address included in the mail information MI2 as a destination.

In each of the above-described Case 1 and Case 2, the mediation server 10 analyses the image data included in the PDF file received from the scanner 100, and specifies the partial image data representing the code manuscript (T440). Then, the mediation server 10 sends the PDF file PF1 including the partial image data representing the partial manuscripts PM1 scanned after the code manuscript CM1 to the destination obtained from the QR code QC1 in the code manuscript CM1 (T442A, T454). Further, the mediation server 10 sends the PDF file PF2 including the partial image data representing the partial manuscripts PM2 scanned before the code manuscript CM1 to the destination obtained from the QR code QC2 in the code manuscript CM2 (T442B, T456). Due to this, the scanner can send two partial image data in a state where two partial image data obtained by using the image data in the PDF file is divided (i.e., in a state where the data is divided into two PDF files PF1, PF2) without using a special scanner capable of specifying the partial image data representing the code manuscript among the image data in the PDF file.

It should be noted that in a case where JPEG is selected in the selection section SS2 of FIG. 3, in Case C1 the CPU 32 does not generate PDF files PF1 and PF2, in T 442A sends a storing request including two JPEG files representing two partial manuscripts PM1 instead of the PDF file PF1, and in T442B sends a storing request including two JPEG files representing two partial manuscripts PM2 instead of the PDF file PF2. Further, in the case where JPEG is selected in the selection section SS2 of FIG. 3, in Case C2 the CPU 32 performs sending of the e-mail M1 with attachments of the two JPEG files representing the two partial manuscripts PM1 in T454, and sending of the e-mail M2 with attachments of two JPEG files representing the two partial manuscripts PM2 in T456. Also in these cases, the scanner can send the two partial image data in a state where two partial image data is divided (i.e., in a state where destinations of the two partial image data are different) without using a special scanner capable of specifying the partial image data representing a code manuscript among the image data constituted of a plurality of JPEG files.

Figure 7:
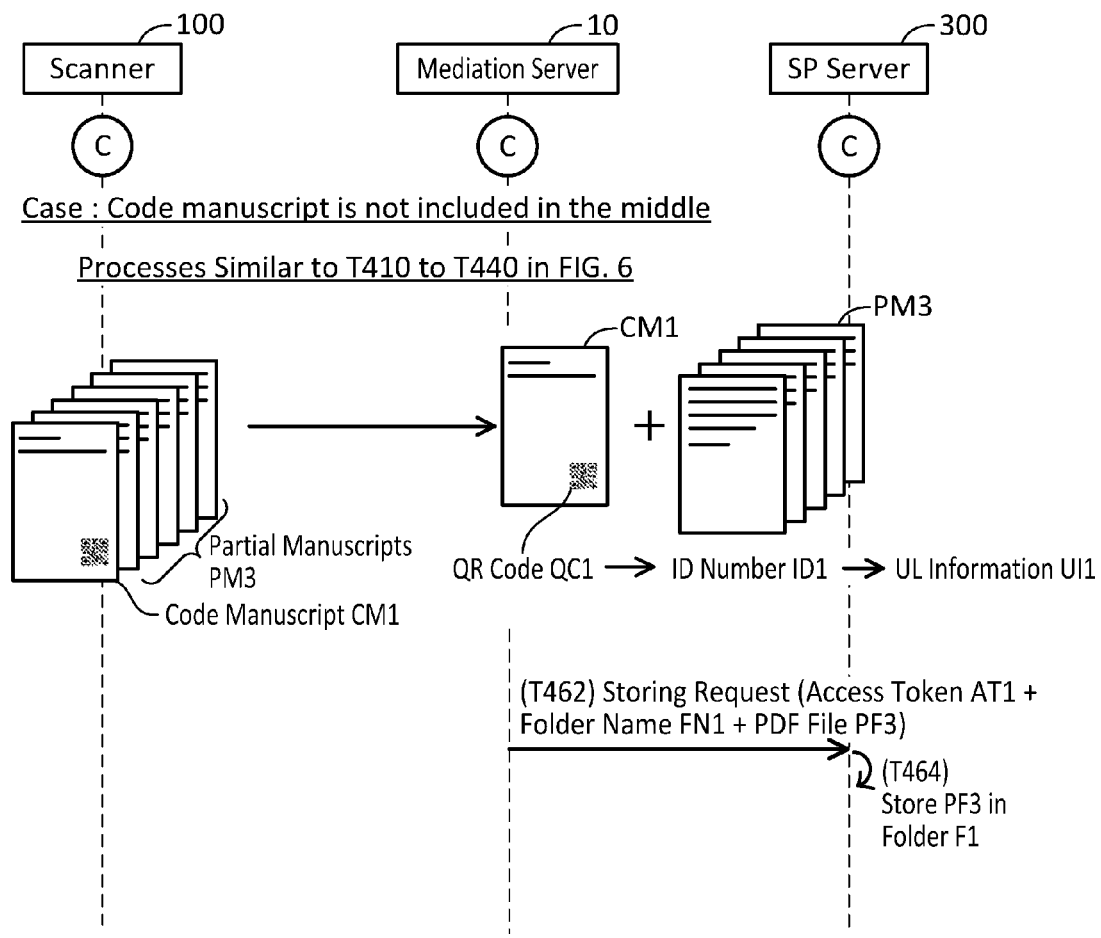
FIG. 7 shows a sequence diagram of another case, in which a code manuscript is used.

(Processes Relating to Code Sending: FIG. 7)

The other case relating to the code sending will be described with reference to FIG. 7. In this case, the upload service is selected in the service selection screen SC3 of FIG. 3, and the PDF is selected in the selection section SS2 of the scan setting screen SC4. Then scan of each of five manuscripts including only one code manuscript CM1 is performed sequentially. The five manuscripts include the code manuscript CM1 to be scanned first and four partial manuscripts PM3 to be scanned after the code manuscript CM1. That is, the five manuscripts include the code manuscript CM1 at the top thereof, but not including any code manuscript inserted in the rest thereof.

First, the same processes as those in T410 to T440 of FIG. 6 are performed. In T440, the CPU 32 generates the PDF file PF3 including the partial image data representing the four partial manuscripts PM3 and excluding the code manuscript CM1. Then, the CPU 32 obtains the identification number ID1 from the QR code QC1 in the code manuscript CM1, and obtains the UL information UI1 associated with the identification number ID1.

In T462, the CPU 32 sends the storing request including the access token AT1, the folder name FN1 included in the UL information UI1, and the PDF file PF3 to the SP server 300. Due to this, in T464 the PDF file PF3 is stored in the folder F1.

It should be noted that in a case where "not use" is selected in the selection section SS3 of the scan setting screen SC4 of FIG. 3, and scan of five manuscripts including only one code manuscript CM1 is performed, the processes in T410 to T440 of FIG. 5 are not performed, and the same processes as in T200 to T230 of FIG. 4 are performed. In this case, a PDF file including all of image data representing the five manuscripts is stored in the folder F1. That is, partial image data representing the code manuscript CM1 is also stored in the folder F1.

As indicated in this case, in a case where the user desires to send the image data to the destination corresponding to the QR code QC1 in the code manuscript CM1, the user can select "code" in the selection section SS3 of FIG. 3. On the other hand, in a case where the user desires to send the image data to a destination other than the destination corresponding to the QR code QC1 in the code manuscript CM1, the user can select the destination in T208 of FIG. 4 by selectin "not use" in the selection section SS3. The user can select the item according to his intension in the selection section SS3. The user convenience can be improved.

(Variations for Separating a Plurality of Manuscripts: FIG. 8)

Variations for separating a plurality of manuscripts will be explained with reference to FIG. 8. Variation (1) corresponds to Cases B1 to B3 of FIG. 5. The mediation server 10 does not send the partial image data representing the blank manuscript BM1, but sends the partial image data representing the partial manuscripts PM1 and the partial image data representing the partial manuscripts PM2 (T342, T345, T362 of FIG. 5). In this case, the partial image data representing the partial manuscripts PM1 is one example of "first partial image data" and "first target data", and the partial image data representing the partial manuscripts PM2 is one example of "second partial image data" and "second target data".

Variation (2) corresponds to Case C1 and Case C2 of FIG. 6. The mediation server 10 does not send the partial image data representing the code manuscript CM1 and the partial image data representing the code manuscript CM2, and sends the partial image data representing the partial manuscripts PM1 and the partial image data representing the partial manuscripts PM2 (T442A, T442B, T454, T456 of FIG. 6). In this case, the code manuscript CM1 and the code manuscript CM2 are examples of "separation manuscript" and "manuscript scanned first", respectively. The partial image data representing the partial manuscripts PM1 is one example of "first partial image data" and "first target data". The partial image data representing the partial manuscripts PM2 is one example of "second partial image data" and "second target data". Further the QR code in the code manuscript CM1 and QR code in the code manuscript CM2 is one example of "first relation image" and "second relation image" respectively.

Variation (3) indicates a case where "yes" in check state is obtained in T440 of FIG. 6. In this case, in T440 the mediation server 10 generates a PDF file including image data representing the partial manuscript PM1' including the code manuscript CM1 and the partial manuscripts PM1 and a PDF file including image data representing the partial manuscript PM2' including the code manuscript CM2 and the partial manuscripts PM2. Then the mediation server 10, similarly to processes in T442A and T442B (or T454 and T456), sends each of the PDF files. In this case, the code manuscript CM1 is one example of "separation manuscript". The partial image data representing the partial manuscripts PM1 and the partial image data representing the partial manuscripts PM1' are examples of "first partial image data" and "first target data", respectively. Further, the partial image data representing the partial manuscripts PM2 and the partial image data representing the partial manuscripts PM2' are examples of "second partial image data" and "second target data", respectively.

(Correspondence Relationship)

The SP server 300 is one example of "a storage server". In Case B1 of FIG. 5, the folder F1 is one example of "first destination" and "second destination". Further, in Case B2 the mail address in the mail information MI3 is one example of "a first destination" and "a second destination". In Case C1 of FIG. 6, the folder F1 and folder F2 are examples of "first destination" and "second destination", respectively. In Case C2, the mail address in the mail information MI1 and the mail address in the mail information MI2 are examples of "first destination" and "second destination", respectively. In FIGS. 5 and 6, the PDF file PF1 and PDF file PF2 are examples of "first file" and "second file", respectively. The scan setting screen SC4 including the selection section SS3 of FIG. 3 is one example of "selection screen". The PDF with certificate is one example of "specific file format". In T226 of FIG. 4, sending upload request to the scanner 100 is one example of "specific process".

Here, the technique of the case of FIG. 7 will be generally expressed. A mediation server comprises: a processor; and a memory configured to store computer-readable instructions therein, the computer-readable instructions, when executed by the processor, causing the mediation server to perform: causing a display unit of the scanner to display a selection screen for causing the user to select whether or not image data is to be sent to a destination indicated by destination information obtained by using destination image data, the destination image data representing a destination manuscript including an object relating to a destination of the image data; receiving result information indicating a selection result in the selection screen from the scanner via a network; receiving first image data generated by scanning one or more pieces of the manuscripts including the destination manuscript via the network in a first case where the selection result indicated by the result information indicates that the image data is to be sent to the destination; in the first case, obtaining the destination information by using the destination image data, which is a part of the first image data, representing the destination manuscript, in the first case, sending at least a part of image data among the first image data to the destination indicated by the obtained destination information via the network; and a specific process so that second image data is sent to a specific destination without using the destination image data representing the destination manuscript in a second case where the selection result indicated by the result information indicates that the image data is not to be sent to the destination. The code manuscripts CM1 and the QR code QC1 of FIG. 7 is one example of "destination manuscript" and "object" respectively. The case where "code" is selected in the selection section SS3 of FIG. 3, and the case where "not use" is selected in the selection section SS3 of FIG. 3, is one example of "first case" and "second case" respectively.

(Modification 1)

In Variation (4) of FIG. 8, the partial manuscripts PM2, the code manuscript CM1, the partial manuscripts PM1, and the code manuscript CM2 are scanned in this order. Then the mediation server 10, for example, generates the PDF file including the partial image data representing the partial manuscripts PM1 to be scanned after the code manuscript CM1, and sends the PDF file to the destination obtained from the QR code in the code manuscript CM2. Further, the mediation server 10 generates the PDF file including the partial image data representing the partial manuscripts PM2 to be scanned before the code manuscript CM1, and sends the PDF file to the destination obtained from the QR code of the code manuscript CM1. In this modification, the code manuscript CM1 is one example of "separation manuscript". The partial image data representing the partial manuscripts PM1 is one example of "first partial image data" and "first target data", and the partial image data representing the partial manuscripts PM2 is one example of "second partial image data" and "second target data".

(Modification 2)

In Variation (5) of FIG. 8, scan of the partial manuscripts PM2, a code manuscript CM1' and the partial manuscripts PM1 is performed in this order. In this modification, in the registration table 38 of FIG. 1, one single identification number is registered associated with two destinations (e.g., two folder names). The mediation server 10 obtains the one single identification number from the QR code in the code manuscript CM1', and obtains two destinations associated with the one single identification number from the registration table 38. Then the mediation server 10 sends the PDF file including the partial image data representing the partial manuscripts PM1 to one of the above-described two destinations, and sends the PDF file including the partial image data representing the partial manuscript PM2 to the other destination of the above-described two destinations. In this modification, the code manuscript CM1' is one example of "a separation manuscript". The partial image data representing the partial manuscript PM1 is one example of "first partial image data" and "first target data", and the partial image data representing the partial manuscript PM2 is one example of "second partial image data" and "second target data".

(Modification 3)

For example, In T428 of FIG. 6, a situation is assumed where the mediation server 10 receives six JPEG files representing six manuscripts PM1, PM2, CM1, and CM2. In this case the mediation server 10, for example, may generate one PDF file from two JPEG files representing the partial manuscripts PM1. Then in T442A, the mediation server 10 may send a storing request including the PDF file to the SP server 300, and in T442B, it may send a storing request including two JPEG files representing the manuscripts PM2 to the SP server 300. That is, in this modification, the mediation server 10 may not generate two PDF files but may generate only one PDF file from the two JPEG files representing the partial manuscripts PM1. Generally, at least one of "first file" and "second file" may be generated.

(Modification 4)

The code image CI1 of FIG. 2 may include a character image indicating the identification number instead of the QR code QC1. In this case in T440 of FIG. 6, the mediation server 10 may obtain the identification number from the character image by using OCR (abbreviation of "Optical Character Reader") function. In this modification, the character image is one example of "first relation image" and "second relation image".

(Modification 5)

The memory 34 of the mediation server 10 may not store the registration table 38. Thus in FIG. 2, processes of T110 to T114 may not be performed, and in T116 the terminal device 200 may generate the QR code by encoding the input information actually inputted in the setting screen SC1 and the actual check information. Then in T440 of FIG. 6, the mediation server 10 may perform readout of the QR code and obtain the input information and the check information. In this modification, the input information and the check information is one example of "relation information".

(Modification 6)

In T114 of FIG. 2, the mediation server 10 may send pass information indicating a location of registration information in the memory 34 (e.g., URL) instead of the identification number to the terminal device 200. In this modification the pass information is one example of "identification information".

(Modification 7)

In T118 of FIG. 2, the terminal device 200 may print the QR code in a first sheet having a relatively small size. Then the user may prepare the code manuscript by attaching the first sheet on which the QR code is printed to a second sheet having a relatively large size. In this modification, the code manuscript is one example of "separation manuscript".

(Modification 8)

In each of the above embodiments, each of the processes of FIG. 2 to FIG. 7 is implemented by the CPU 32 of the mediation server 10 performing processes in accordance with the program 36. Alternatively, at least one of the processes may be implemented by hardware such as a logic circuit, etc.

The invention claimed is:

1. A mediation server comprising:

a processor; and a memory configured to store computer-readable instructions therein, the computer-readable instructions, when executed by the processor, causing the mediation server to perform:

sending a scan instruction to a scanner via a network;

receiving first image data from the scanner via the network in response to sending the scan instruction, the first image data being generated by the scanner scanning each of M (the M being an integer of 3 or larger) pieces of manuscripts sequentially;

analyzing the first image data so as to specify separation image data which is a part of the first image data, the separation image data representing a predetermined separation manuscript to be scanned m-th (the m being an integer of 2 or larger and smaller than M) among the M pieces of the manuscripts, the separation manuscript being for separating one or more pieces of manuscripts to be scanned after the separation manuscript and one or more pieces of manuscripts to be scanned before the separation manuscript;

sending first target data to a first destination and second target data to a second destination via the network in a specific state where the first target data and the second target data which are obtained by using the first image data are divided, the first target data being obtained by using first partial image data which is a part of the first image data, the first partial image data representing at least one piece of manuscript among the one or more pieces of manuscripts to be scanned after the separation manuscript, the second target data being obtained by using second partial image data which is a part of the first image data, the second partial image data representing at least one piece of manuscript among the one or more pieces of manuscripts to be scanned before the separation manuscript;

causing a display unit of the scanner to display a selection screen for causing a user to select whether or not the sending of the first target data and the second target data in the specific state is to be performed;

obtaining result information indicating a selection result in the selection screen from the scanner via the network; and a predetermined process for sending second image data obtained by scanning the M pieces of manuscripts to a specific destination without sending the first target data and the second target data in the specific state, in a case where the selection result indicated by the result information indicates that the sending of the first target data and the second target data in the specific state is not to be performed, and wherein the sending of the first target data and the second target data obtained by scanning the M pieces of manuscripts in the specific state is performed in a case where the selection result indicated by the result information indicates that the sending of the first target data and the second target data in the specific state is to be performed.

2. The mediation server as in claim 1, wherein the computer-readable instructions, when executed by the processor, cause the mediation server to further perform:

generating at least one file among a first file and a second file different from the first file, the first file being one file including the first target data obtained by using the first partial image data representing two or more pieces of manuscripts, the second file being one file including the second target data obtained by using the second partial image data representing two or more pieces of manuscripts, wherein the sending of the first target data and the second target data includes performing at least one sending among the sending of the first file to the first destination and the sending of the second file to the second destination.

3. The mediation server as in claim 1, wherein
the receiving of the first image data includes receiving one file including the first image data representing the M pieces of manuscripts from the scanner.

4. The mediation server as in claim 1, wherein
the first image data is not received from the scanner in response to the sending of the scan instruction in a case where the predetermined process is to be performed, and
the predetermined process includes sending, to the scanner via the network, a request for causing the scanner to send the second image data to a specific destination.

5. The mediation server as in claim 1, wherein
the analyzing of the first image data is performed in a case where a file format of the first image data is not a specific file format including a certificate, and
the analyzing of the first image data is not performed in a case where the file format of the first image data is the specific file format,
wherein the computer-readable instructions, when executed by the processor, cause the mediation server to further perform:
a predetermined process for sending third image data obtained by scanning the M pieces of manuscripts to a specific destination without sending of the first target data and the second target data in the specific state, in the case where the file format of the first image data is the specific file format.

6. The mediation server as in claim 5, wherein
the first image data is not received from the scanner in response to the sending of the scan instruction in a case where the predetermined process is to be performed, and
the predetermined process includes sending, to the scanner via the network, a request for causing the scanner to send the third image data to the specific destination.

7. The mediation server as in claim 1, wherein
the separation image data represents a first relation image which is related to at least one destination among the first destination and the second destination,
wherein the computer-readable instructions, when executed by the processor, cause the mediation server to further perform:
obtaining first destination information indicating the at least one destination by using the first relation image,
wherein the sending of the first target data and the second target data includes performing, by using the obtained first destination information, at least one sending among the sending of the first target data to the first destination and the sending of the second target data to the second destination.

8. The mediation server as in claim 7, wherein
the separation image data represents the first relation image which is related to the first destination among the first destination and the second destination,
the obtaining of the first destination information includes obtaining the first destination information indicating the first destination among the first destination and the second destination by using the first relation image,
the sending of the first target data and the second target data includes sending the first target data to the first destination by using the obtained first destination information, and
the first image data includes a head image data which is a part of the first image data, the head image data representing a manuscript to be scanned first among the M pieces of the manuscripts, the head image data further representing a second relation image which is related to the second destination among the first destination and the second destination,
wherein the computer-readable instructions, when executed by the processor, cause the mediation server to further perform:
obtaining second destination information indicating the second destination among the first destination and the second destination by using the second relation image, and
the sending of the first target data and the second target data includes sending of the second target data to the second destination by using the obtained second destination information.

9. The mediation server as in claim 7, wherein
the at least one destination includes a mail address,
the first relation image is further related to a message text which is to be described in an electronic mail, and
the sending of the first target data and the second target data includes performing at least one sending, to the mail address as a destination, among sending of an electronic mail including the message text and having the first target data as an attachment and sending of an electronic mail including the message text and having the second target data as an attachment.

10. The mediation server as in claim 7, wherein
the at least one destination includes a folder name in a storage server into which target data is to be uploaded,
the first relation image is further related to a file name of a file including the target data, and
the sending of the first target data and the second target data includes performing at least one sending, to a folder indicated by the folder name as a destination, among sending of a first file having the file name and including the first target data and sending of a second file having the file name and including the second target data.

11. The mediation server as in claim 7, wherein
the first relation image includes an image encoded from relation information which is related to the first destination information.

12. The mediation server as in claim 7, wherein
the computer-readable instructions, when executed by the processor, cause the mediation server to further perform:
storing the first destination information in a memory,
wherein the obtaining of the first destination information includes:
obtaining, by using the first relation image, identification information for identifying the first destination information in the memory; and
obtaining the first destination information indicated by the identification information from the memory.

13. The mediation server as in claim 1, wherein
the separation image data represents a predetermined image which is not related to the first destination and the second destination, and the sending of the first target data and the second target data includes sending a first file to the first destination and sending a second file different from the first file to the second destination which is identical to the first destination, the first file being one file including the first target data, the second file being one file including the second target data.

14. A mediation server comprising:

a processor; and a memory configured to store computer-readable instructions therein, the computer-readable instructions, when executed by the processor, causing the mediation server to perform:

sending a scan instruction to a scanner via a network;

receiving first image data from the scanner via the network in response to sending the scan instruction, the first image data being generated by the scanner scanning each of M (the M being an integer of 3 or larger) pieces of manuscripts sequentially;

analyzing the first image data so as to specify separation image data which is a part of the first image data, the separation image data representing a predetermined separation manuscript to be scanned m-th (the m being an integer of 2 or larger and smaller than M) among the M pieces of the manuscripts, the separation manuscript being for separating one or more pieces of manuscripts to be scanned after the separation manuscript and one or more pieces of manuscripts to be scanned before the separation manuscript;

sending first target data to a first destination and second target data to a second destination via the network in a specific state where the first target data and the second target data which are obtained by using the first image data are divided, the first target data being obtained by using first partial image data which is a part of the first image data, the first partial image data representing at least one piece of manuscript among the one or more pieces of manuscripts to be scanned after the separation manuscript, the second target data being obtained by using second partial image data which is a part of the first image data, the second partial image data representing at least one piece of manuscript among the one or more pieces of manuscripts to be scanned before the separation manuscript, the separation image data represents a first relation image which being related to at least one destination among the first destination and the second destination;

causing a display unit of the scanner to display a selection screen for causing a user to select whether or not the sending of the first target data and the second target data in the specific state is to be performed;

obtaining result information indicating a selection result in the selection screen from the scanner via the network;

obtaining first destination information indicating the at least one destination by using the first relation image in a case where the selection result indicated by the result information indicates that the sending of the first target data and the second target data in the specific state is to be performed; and a predetermined process for sending second image data obtained by scanning the M pieces of manuscripts to a specific destination without sending of the first target data and the second target data in the specific state, in a case where the selection result indicated by the result information indicates that the sending of the first target data and the second target data in the specific state is not to be performed, wherein the sending of the first target data and the second target data includes performing, by using the obtained first destination information, at least one sending among the sending of the first target data obtained by scanning the M pieces of manuscripts to the first destination and the sending of the second target data obtained by scanning the M pieces of manuscripts to the second destination, in a case where the selection result indicated by the result information indicates that the sending of the first target data and the second target data in the specific state is to be performed.

15. A mediation server comprising:

means for sending a scan instruction to a scanner via a network;

means for receiving first image data from the scanner via the network in response to sending the scan instruction, the first image data being generated by the scanner scanning each of M (the M being an integer of 3 or larger) pieces of manuscripts sequentially;

means for analyzing the first image data so as to specify separation image data which is a part of the first image data, the separation image data representing a predetermined separation manuscript to be scanned m-th (the m being an integer of 2 or larger and smaller than M) among the M pieces of the manuscripts, the separation manuscript being for separating the manuscripts into one or more pieces of manuscripts to be scanned after the separation manuscript and one or more pieces of the manuscripts to be scanned before the separation manuscript;

means for sending first target data to a first destination and second target data to a second destination via the network in a specific state where the first target data and the second target data which are obtained by using the first image data are divided, the first target data being obtained by using first partial image data which is a part of the first image data, the first partial image data representing at least one piece of manuscript among the one or more pieces of manuscripts to be scanned after the separation manuscript, the second target data being obtained by using second partial image data which is a part of the first image data, the second partial image data representing at least one piece of manuscript among the one or more pieces of manuscripts to be scanned before the separation manuscript;

means for causing a display unit of the scanner to display a selection screen for causing the user to select whether or not the sending of the first target data and the second target data in the specific state is to be performed;

means for obtaining result information indicating a selection result in the selection screen from the scanner via the network; and means for performing a predetermined process for sending second image data obtained by scanning the M pieces of manuscripts to a specific destination without sending the first target data and the second target data in the specific state, in a case where the selection result indicated by the result information indicates that the sending of the first target data and the second target data in the specific state is not to be performed, and wherein the sending of the first target data and the second target data obtained by scanning the M pieces of manuscripts in the specific state is performed in a case where the selection result indicated by the result information indicates that the sending of the first target data and the second target data in the specific state is to be performed.

* * * * *